(12) United States Patent
Finn et al.

(10) Patent No.: US 8,194,689 B2
(45) Date of Patent: Jun. 5, 2012

(54) METHOD FOR BRING-UP OF VOICE OVER INTERNET PROTOCOL TELEPHONES

(75) Inventors: Norman W. Finn, Livermore, CA (US); Hei Tao Fung, Santa Clara, CA (US); Ahsan Habib, Los Gatos, CA (US); Pere Joan Monclus Argany, San Jose, CA (US); Stefano Testa, San Jose, CA (US); Kiran K. Toutireddy, Mountain View, CA (US); Keith McCloghrie, Middletown, NY (US); Susan M. Sauter, Murphy, TX (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 12/776,963

(22) Filed: May 10, 2010

(65) Prior Publication Data

US 2010/0220631 A1 Sep. 2, 2010

Related U.S. Application Data

(63) Continuation of application No. 10/125,324, filed on Apr. 17, 2002, now Pat. No. 7,729,367.

(60) Provisional application No. 60/285,507, filed on Apr. 19, 2001.

(51) Int. Cl.
   *H04L 12/56* (2006.01)
(52) U.S. Cl. ........................ 370/409; 370/352
(58) Field of Classification Search .................. 370/230, 370/254, 389, 395.53, 392, 395, 400–403, 370/412, 467, 470; 455/455; 709/221, 502
See application file for complete search history.

(56) References Cited

U.S. PATENT DOCUMENTS

| | | | |
|---|---|---|---|
| 5,293,484 A | 3/1994 | Dabbs, III et al. | 395/164 |
| 5,428,608 A * | 6/1995 | Freeman et al. | 370/261 |
| 5,436,510 A | 7/1995 | Gilbert | 307/38 |
| 5,539,739 A * | 7/1996 | Dike et al. | 370/352 |
| 5,652,893 A | 7/1997 | Ben-Meir et al. | 713/310 |
| 5,751,967 A | 5/1998 | Raab et al. | 709/228 |
| 5,892,912 A * | 4/1999 | Suzuki et al. | 370/395.53 |
| 5,968,126 A | 10/1999 | Ekstrom et al. | 709/225 |
| 5,999,536 A | 12/1999 | Kawafuji et al. | 370/401 |
| 6,035,105 A * | 3/2000 | McCloghrie et al. | 709/236 |
| 6,075,784 A | 6/2000 | Frankel et al. | 370/356 |
| 6,122,255 A | 9/2000 | Bartholomew et al. | 370/237 |
| 6,181,699 B1 * | 1/2001 | Crinion et al. | 370/392 |
| 6,223,218 B1 * | 4/2001 | Iijima et al. | 709/221 |
| 6,249,576 B1 | 6/2001 | Sassin et al. | 379/218.01 |
| 6,282,577 B1 * | 8/2001 | Okanoue et al. | 709/250 |
| 6,553,100 B1 | 4/2003 | Chen et al. | 379/37 |
| 6,571,181 B1 | 5/2003 | Rakshani et al. | 702/60 |
| 6,577,642 B1 | 6/2003 | Fijolek et al. | 370/465 |
| 6,580,919 B1 | 6/2003 | Saito | 455/522 |
| 6,622,019 B1 * | 9/2003 | Shalem et al. | 455/445 |
| 6,625,736 B1 | 9/2003 | Berthaud et al. | 713/300 |
| 6,741,862 B2 | 5/2004 | Chung et al. | 455/452.1 |
| 6,781,955 B2 | 8/2004 | Leung | 370/232 |
| 6,847,620 B1 | 1/2005 | Meier | 370/328 |
| 6,850,509 B2 | 2/2005 | Lee et al. | 370/336 |

(Continued)

*Primary Examiner* — Andrew Lai

(74) *Attorney, Agent, or Firm* — Baker Botts L.L.P.

(57) ABSTRACT

A system and method for implementing telephony devices in a distributed network environment is disclosed. The present invention provides for voice transmissions to be given a dedicated virtual local area network ("VLAN") for packet transmission and reception to prevent poor quality of service. Non-voice data packets are transmitted on a separate VLAN.

17 Claims, 3 Drawing Sheets

U.S. PATENT DOCUMENTS

| | | | |
|---|---|---|---|
| 6,885,657 B1 | 4/2005 | Rabenko et al. | 370/352 |
| 7,009,968 B2 | 3/2006 | Ambe et al. | 370/389 |
| 7,227,859 B1 | 6/2007 | Finn et al. | 370/354 |
| 7,366,164 B1 | 4/2008 | Habib et al. | 370/356 |
| 2001/0021186 A1 | 9/2001 | Ono et al. | 370/352 |
| 2002/0044567 A1* | 4/2002 | Voit et al. | 370/467 |
| 2002/0075844 A1* | 6/2002 | Hagen | 370/351 |
| 2002/0080808 A1* | 6/2002 | Leung | 370/412 |
| 2005/0149651 A1 | 7/2005 | Doak et al. | 710/52 |

* cited by examiner

METHOD FOR BRING-UP OF VOICE OVER INTERNET PROTOCOL TELEPHONES

RELATED APPLICATIONS

This application is a continuation of U.S. application Ser. No. 10/125,324 filed Apr. 17, 2002, now U.S. Pat. No. 7,729,367 and entitled, "Method for Bring-Up of Voice Over Internet Protocol Telephones" which claims the benefit of U.S. Provisional Application Ser. No. 60/285,507 filed Apr. 19, 2001, which is herein incorporated by reference for all purposes.

TECHNICAL FIELD OF THE INVENTION

The present invention relates generally to communication devices in a distributed network environment. In particular, the present invention relates to a system and method for implementing telephony devices in a distributed network environment where voice packets are given a dedicated virtual local area network for packet transmission and reception to prevent poor quality of service.

BACKGROUND OF THE INVENTION

Nearly all business telephone systems are based on a centralized or star network design. In such a conventional system, all telephones and trunk lines converge on a single switching point, typically, a public branch exchange ("PBX") or in some cases a programmable switch. Despite the popularity of this conventional design, there are several problems with this kind of architecture. The problems include a single point of failure, proprietary closed architecture, and antiquated administration tools.

Conversely, telephony devices have more recently been implemented in distributed network environments, namely, Internet Protocol (IP) networks. In such systems IP telephony devices are used as end user devices (telephones) and to route data between nodes simultaneously, offering truly compelling benefits including no central point of failure, reduced tolls, essentially unlimited scalability, open architecture and user friendly administration tools. This is often called IP telephony.

Currently, IP telephony has limitations including poor quality of service. Poor quality of service for IP telephony includes, but is not limited to, packet delays or collisions which cause anomalies in the voice transmission on the receiver's end, and disconnection of the sender from the receiver due to discontinuity in the data stream. These problems can be attributed to the fact that the Internet is an unmanaged network of sub-networks with no resource allocation authority. As a result, it is common to encounter situations where there are too many users trying to communicate too much data through an already saturated pipeline. This problem is usually not present in corporate local or wide area networks since they generally have a resource allocation authority in the form of an engineer or manager. This person is usually responsible for designing a data network to have adequate bandwidth, redundant switching points, etc. However, if network traffic exceeds predicted levels in such a corporate local or wide area network, quality of service for IP telephony devices may also be poor.

SUMMARY OF THE INVENTION

The present invention relates generally to communication devices in a distributed network environment. In particular, the present invention relates to a system and method for implementing telephony devices in a distributed network environment, where voice transmissions are given a dedicated virtual local area network ("VLAN"), for packet transmission and reception, to prevent poor quality of service. In particular, the present invention provides a multiple port virtual local area network ("multi-VLAN port") telephony device. The multi-VLAN port telephony device includes multiple physical ports. The data passing through these ports is selectively mapped to unique VLANs. In a first embodiment of the present invention, the multi-VLAN port telephony device uses the native VLAN for sending and receiving non-voice data traffic and uses an additional VLAN ("voice VLAN") for sending and receiving voice data traffic. The VLAN assignments are made by a network switch residing on a network node, using a messaging system with a pre-defined protocol to communicate and assign VLANs to devices connected thereto.

A particular embodiment provides the technical advantage of discriminating data based upon data type such that the voice VLAN may be given a higher priority than the native VLAN, thus increasing the quality of service for voice communications. Further, having telephony devices on separate VLANs becomes extremely useful when a large number of telephony devices are added to an existing network where the number of available IP addresses is not high enough to accommodate the large number of telephony devices. A separate voice VLAN, in accordance with the present invention, provides a new subnet and a new set of IP addresses.

In accordance with a another embodiment of the present invention, the network switch regulates and allocates power for a multi-VLAN port telephony device connected adjacent to the network switch, where the network switch is capable of providing power. This second embodiment provides the technical advantage of efficiently using available power at the network switch.

In accordance with still another embodiment of the present invention, the multi-VLAN port telephony device re-marks the header of incoming packets to designate the appropriate VLAN. This third embodiment provides the technical advantage of ensuring that non-voice data traffic is properly marked and not sent on the voice VLAN. In this way, a sending device may not circumvent the VLAN assignments provided by the network switch of the present invention.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein.

DETAILED DESCRIPTION OF THE INVENTION

Figure 1:
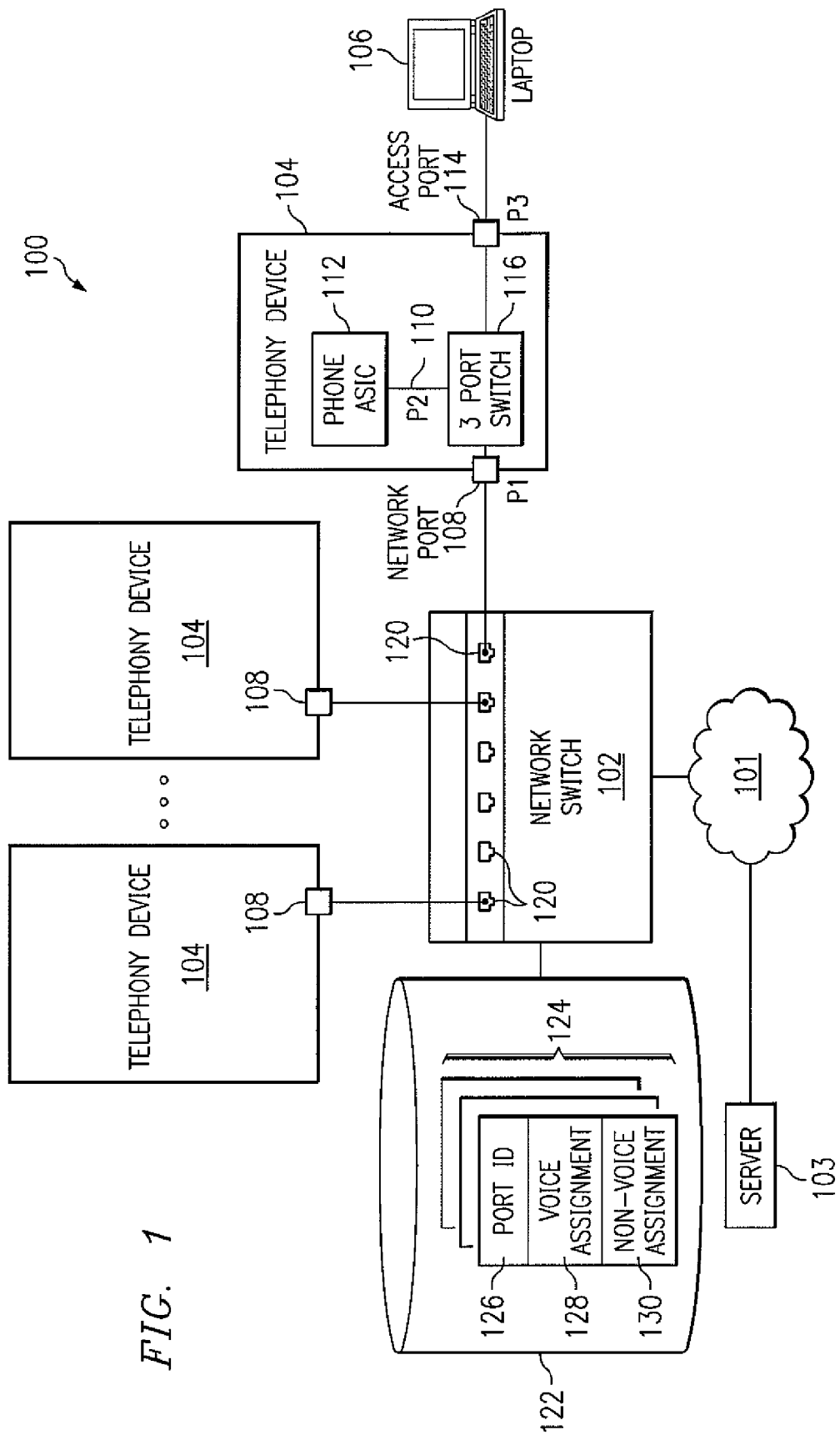
FIG. 1 is an illustration of a network switch, telephony device and external network device networked in accordance with a first exemplary embodiment of the present invention.

Now referring to the drawings, FIG. 1 illustrates telephony system 100 that includes a network 101, a network switch 102, connected to a multiple virtual local area network ("VLAN") port telephony device ("telephony device") 104 and an external network device 106. The external network device 106 may be a general purpose computer, computer server, or any other device which sends or receives data over a distributed network. A laptop is illustrated in FIG. 1, representative of any external network device 106.

Network 101 represents any hardware and/or software configured to communicate information in the form of packets, cells, frames, segments, or other portions of data (generally referred to as "packets"). Network 101 may include routers, hubs, switches, gateways, or any other suitable components in any suitable form or arrangement. Network 101 may include a server 103. Server 103 may assign network addresses to components of network 101. For example, server 103 may be a dynamic host configuration protocol (DHCP) server 103 that assigns a network address to a component in response to a DHCP request.

Network switch 102 represents any hardware and/or software for switching packets between telephony device 104 and network 101. Network switch 102 includes interface ports 120 and a memory 122. Interface ports 120 represent any connection, real or virtual, allowing network switch 102 to exchange packets with other devices. Memory 122 represents any form of information storage, such as optical media, magnetic media, random access memory, read-only memory, programmable logic, removable media, or any other suitable component for storing information. Memory 122 stores a record 124 for each interface port 120. Record 124 includes a port identifier 126, a voice assignment 128, and a data assignment 130. The port identifier 126 identifies the corresponding port 120 that record 124 describes. Voice assignment 128 represents a tag identifying the VLAN to which voice data has been assigned. Non-voice assignment 130 represents a tag identifying the VLAN to which non-voice data has been assigned. A particular VLAN may include multiple ports, and a particular type of data may be assigned to multiple VLANs. The term "tag" refers to any suitable identifier that identifies a VLAN and that can be communicated as part of a packet, such a type-length-value ("TLV") field.

The telephony device 104 includes multiple ports. The multiple ports include a network port (P1) 108, an internal telephone port (P2) 110, and an access port (P3) 114. All three ports 108, 110 and 114 are interconnected by a port switch 116. The port switch 116 defines the VLANs for the telephony device 104 and determines the types of data which propagate on which VLAN in response to messages received from the network switch 102, as described below. The port switch 116 may contain a processor, firmware, random access memory, read only memory, flash memory EEPROM, and/or computer code to accomplish various tasks, described below, to control the data traffic at the telephony device 104. The network port 108 interconnects the network switch 102 with the port switch 116. The internal telephone port 110 interconnects an internal telephone circuit 112 with the port switch 116. The access port 114 is also connected to the port switch 116. The access port 114 provides a connection for the external network device 106 to connect to the telephony device 104 or, using the telephony device 104 as a conduit, to send data to the network switch 102.

Figure 2:
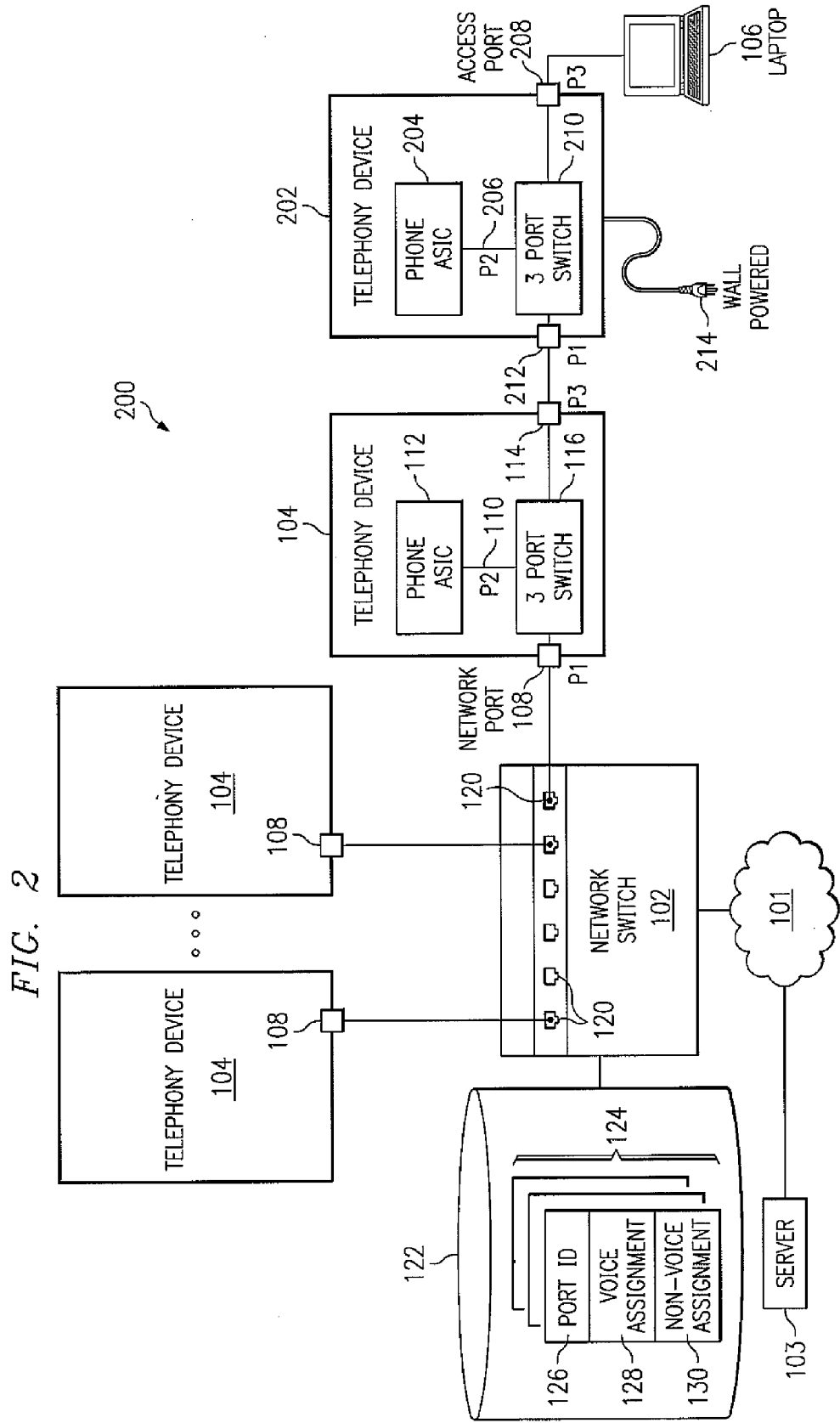
FIG. 2 is an illustration of telephony devices daisy chained in accordance with a second exemplary embodiment of the present invention.

Alternatively, as depicted in FIG. 2, a second telephony device 202 may be connected to the telephony device 104, in a daisy chain configuration via the access port 114 of the telephony device 104 and a network port 212 of the second telephony device 202. In the exemplary embodiment of FIG. 2, the external network device 106 may then be connected to an access port 208 of the second telephony device 202. In this configuration, data passing to and from the external network device 106 is passed through the second telephony device 202 and the first telephony device 104 to reach the network switch 102, where the data will then be routed to its intended destination or received from a sender, respectively.

In accordance with one embodiment of system 100, using FIG. 2 as a reference solely for illustrative purposes, whenever the telephony device 104 is connected to an interface port 120 of the network switch 102 and powered up ("brought up" or "boot-up"), a discovery protocol ("DP") message is sent through the interface port 120 to the telephony device 104. This may be done, for example, three times at one second intervals to ensure reception. A DP message is a packetized message used to detect the existence or non-existence of voice and non-voice devices connected to the interface port 120 in accordance with a pre-defined protocol. Thereafter, the network switch 102 will send the DP message at a reduced frequency, for example once every 30-60 seconds. The DP message contains a voice VLAN identification ("VVID") TLV). The VVID TLV value indicates to the telephony device 104 which VLAN it will transmit voice data on. The VVID value allows the telephony device 104 to get an IP address from a dynamic host configuration protocol ("DHCP") server, such as server 103, coupled directly or through any number of intermediate network components to network switch 102. Thus, once the telephony device 104 has received a VVID TLV from the network switch 102, it sends a DHCP request to the DHCP server to acquire an IP address, using the VVID TLV received from the network switch 102. Further, from then on, all DP messages that the telephony device 104 sends out of the network port 108 and the access port 114 will always contain the VVID TLV as received and set by the network switch 102. In response to these DP messages from the telephony device 104, a neighboring telephony device, e.g., the second telephony device 202, will receive the DP message and set its VVID TLV to the same value. In this way all devices on the network are in constant communication to ensure that new devices are properly configured when "brought-up."

The telephony device 104 will take up to, for example, 3.5 seconds to boot-up and become operational. During this time, if the first three DP messages from the network switch 102 are sent, the telephony device 104 will not be ready to receive them. If this happens, the telephony device 104 will have to wait for up to 30-60 seconds to get the next DP message. In order to avoid this condition, the telephony device 104, once becoming operational, sends a DP trigger TLV requesting the VVID TLV in the DP message that it sends out of the network port 108. Therefore, if the telephony device 104 did not receive the DP message containing the VVID TLV, the DP trigger TLV message from the telephony device 104 will prompt the network switch 102 to re-send the DP message containing the VVID TLV using the same three DP messages in the one second interval scheme. Similarly, the second telephony device 202 also sends a DP trigger TLV to the first telephony device 104 when it becomes operational to prompt the first telephony device to send a DP message with the VVID TLV if not already received. In this way, each adjacent device provides the necessary VLAN information to its new adjacent device through DP messaging.

With respect to non-voice data packet transmission, a port VLAN identifier ("PVID") on the interface port 120 is a native VLAN, which will be used to transmit and receive data to and from the external network device(s) 106 connected to the network switch 102. The native VLAN may be the initial, first and base VLAN on a network and is usually assigned a VLAN number of zero. Therefore, system 100 assigns a first VLAN for exchanging non-voice packets with telephony device 104 and a second VLAN for exchanging voice packets with telephony device 104. By specifying a first and a second VLAN depending on the type of traffic, network switch 102 may then direct the traffic to other network components coupled to network switch 102 in such a manner as to ensure higher quality of service for the second VLAN carrying voice packets. System 100 contemplates any configuration and arrangement of other network components coupled to network switch 102, such as hubs, routers, switches, and other devices, to deliver the network performance of the second VLAN for quality voice communications. Voice data packets and non-voice packets are not commingled, thereby ensuring a quality of service for voice data packet transmission. If the telephony devices 104, 202 are connected in a daisy chain, as in FIG. 2, the PVID will correspond only to the external network device 106 on the access port 208 of the last telephony device 202 in the daisy chain.

Figure 3:
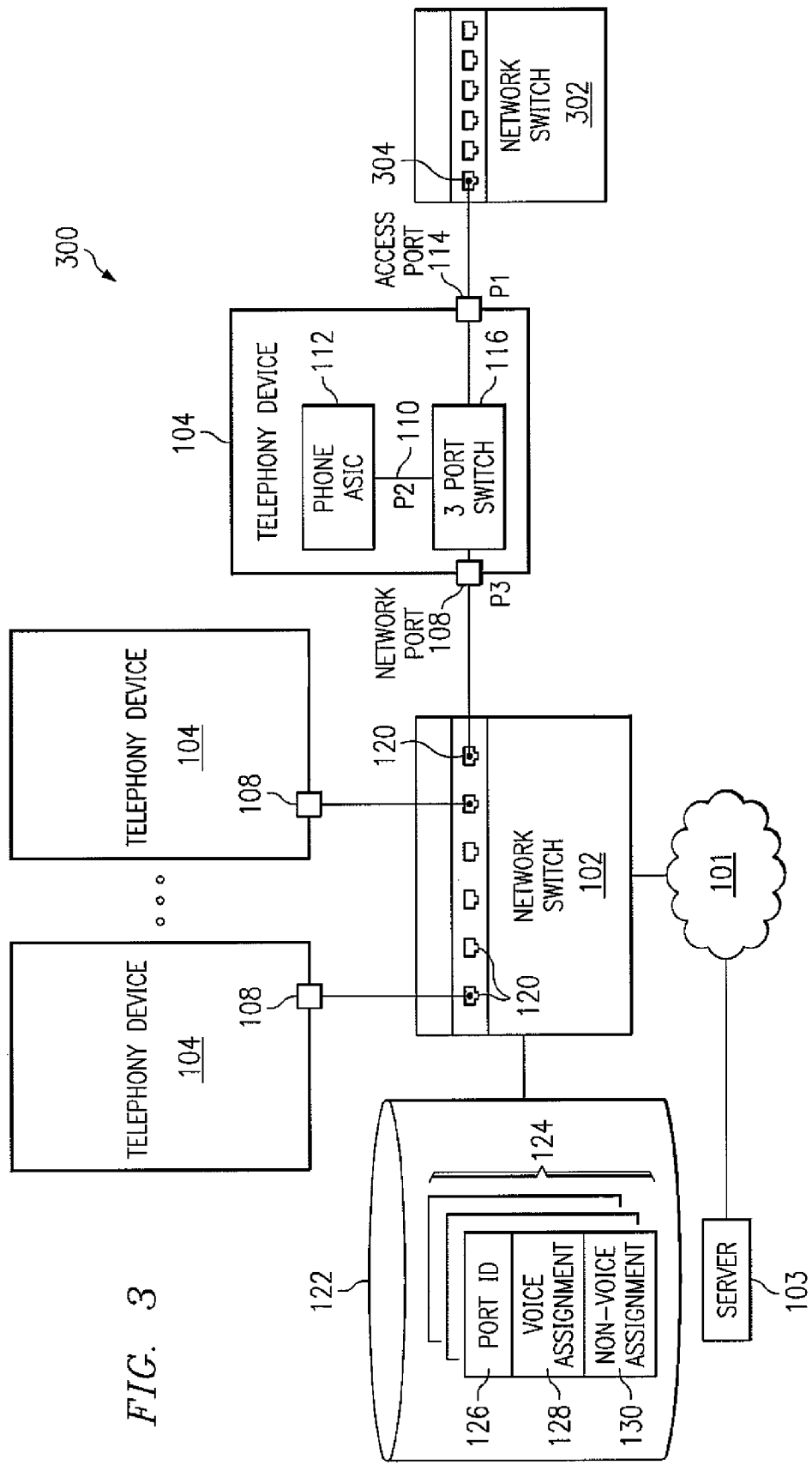
FIG. 3 is an illustration of a telephony device residing between and connected to two network switches in accordance with a third exemplary embodiment of the present invention.

FIG. 3 illustrates another exemplary embodiment of system 100, where the telephony device 104 is connected to both the first network switch 102 and a second network switch 302. Under this embodiment, once the telephony device 104 is "brought up," it sends a DP trigger TLV message on both the network port 108 and the access port 114. If the telephony device 104 receives the DP message from both the first network switch 102 and the second network switch 302, it uses the first VVID TLV of the first DP message received and then reports out in its own network port 108 and access port 114 a DP message containing the VVID TLV it currently has. This essentially functions as a first-come, first-serve basis VVID TLV assignment scheme.

In accordance with another embodiment of system 100, the network switch 102 can supply in-line power through one or more interface ports 120. The network switch 102 includes the capability to supply power to the telephony device 104 directly connected to the network switch 102, and any other device directly connected to network switch 102, thereby directly servicing multiple devices. System 100 has a default wattage for the power consumed by any telephony device, which will be the maximum power consumed by any telephony device 104 known to the network switch 102. When the telephony device 104 is detected by the network switch 102, it does power budget calculations using the default power value to find out if it can supply power to the newly inserted telephony device 104. If sufficient power exists at the network device 102, the network device 102 will provide power at the interface port 120 for the telephony device 104 directly connected thereto.

The telephony device 104 that is plugged into the interface port 120 will then begin receiving power from the interface port 120, but not necessarily the default power. The telephony device 104 may be drawing less power if it is a known less power-consuming device or it may be drawing more if it is an unknown new device which requires more power. In either case, in accordance with an exemplary embodiment, the telephony device 104 identifies the actual power that it needs in milliwatts using a 16-bit value by sending a DP message through the network port 108 to the network switch 102. Upon receiving the actual power needed, the network switch 102 corrects the value in the power budget accordingly. The power consumed by a telephony device 104 is approximately five watts in an exemplary embodiment.

In accordance with another embodiment, the telephony device 104 may be enabled to verify the type of data received in a packet through the access port 114 and whether the data has been properly tagged with the correct VLAN. Many times devices attempting to gain better bandwidth will disguise non-voice data packets as voice data packets in order to be placed on the better performing voice VLAN reserved solely for voice data packets. In order to prevent this behavior, the access port 114 of the telephony device 104 may be toggled between a "trusted" and "untrusted" mode by the network switch 102. This state is toggled by the network switch 102 sending such a command in a DP message. Once placed in an "untrusted" mode, the telephony device 104 checks the contents of all incoming packets through the access port 114 to determine whether such packets are voice or non-voice packets and whether the correct VLAN identifier is in the packet header. If the correct VLAN is identified, the packet header is not modified. Alternatively, all packets may be re-tagged with the appropriate voice VLAN or native VLAN tags, thus eliminating the step of determining what VLAN tag appears in the header of the packet upon reception. If "trusted" mode, the default mode, is triggered by the network switch 102, all the packets received on the access port 114 will pass through as they are tagged when received, without the VLAN value being re-marked or otherwise checked. Similarly with respect to the VVID TLV information discussed above, in a daisy chain configuration of multiple telephony devices 104, 202, as in FIG. 2, after receiving a DP message containing a "trusted" or "untrusted" mode from the network switch 102, the telephony device 104 then sends a DP message to the second telephony device 202 to perform the same "trusted" or "untrusted" operation.

Although the present invention has been described in detail with reference to specific exemplary embodiments thereof, various modifications, alterations and adaptations may be made by those skilled in the art without departing from the spirit and scope of the invention. It is intended that the invention be limited only by the appended claims.

What is claimed is:

1. A method, comprising:
   receiving a request for configuration of a first endpoint;
   determining, using a processor, a first virtual local area network associated with voice data packets, wherein a first virtual local area network identifier is associated with the first virtual local area network;
   determining, using the processor, a second virtual local area network associated with non-voice data packets, wherein a second virtual local area network identifier is associated with the second virtual local area network;
   storing, at a memory, the first virtual local area network identifier and the second virtual local area network identifier, wherein the first virtual local area network identifier is associated with voice data packets and the second virtual local area network identifier is associated with non-voice data packets; and
   communicating, to the first endpoint, a first virtual local area network identifier associated with the first virtual local area network, wherein the first endpoint is operable to transmit data packets comprising the first virtual local area network identifier if the data packets are voice data packets.

2. The method of claim 1, further comprising:
receiving voice data packets and non-voice data packets;
communicating the voice data packets to the first virtual local area network;
communicating the non-voice data packets to the second virtual local area network.

3. The method of claim 1, wherein communicating, to the first endpoint, a first virtual local area network identifier comprises communicating the first virtual local area network identifier in a discovery protocol message.

4. The method of claim 1, wherein the first endpoint comprises a telephony device.

5. The method of claim 1, further comprising receiving data packets from the first endpoint, wherein data packets comprise the first virtual local area network identifier if the data packets are voice data packets.

6. The method of claim 5, further comprising communicating an instruction to the first endpoint to verify that the data packets comprise the first virtual local area network identifier, wherein the first endpoint is operable to change the first local area network identifier to the second virtual local area network identifier if the data packets are non-voice data packets.

7. A non-transitory computer readable medium comprising logic, the logic, when executed, operable to:
receive a request for configuration of a first endpoint;
determine a first virtual local area network associated with voice data packets, wherein a first virtual local area network identifier is associated with the first virtual local area network;
determine a second virtual local area network associated with non-voice data packets, wherein a second virtual local area network identifier is associated with the second virtual local area network;
store the first virtual local area network identifier and the second virtual local area network identifier, wherein the first virtual local area network identifier is associated with voice data packets and the second virtual local area network identifier is associated with non-voice data packets; and
communicate a first virtual local area network identifier associated with the first virtual local area network, wherein the first endpoint is operable to transmit data packets comprising the first virtual local area network identifier if the data packets are voice data packets.

8. The non-transitory computer readable medium of claim 7, the logic further operable to:
receive voice data packets and non-voice data packets;
communicate the voice data packets to the first virtual local area network;
communicate the non-voice data packets to the second virtual local area network.

9. The non-transitory computer readable medium of claim 7, wherein communicating, to the first endpoint, a first virtual local area network identifier comprises communicating the first virtual local area network identifier in a discovery protocol message.

10. The non-transitory computer readable medium of claim 7, wherein the first endpoint comprises a telephony device.

11. The non-transitory computer readable medium of claim 7, the logic further operable to receive data packets from the first endpoint, wherein data packets comprise the first virtual local area network identifier if the data packets are voice data packets.

12. The non-transitory computer readable medium of claim 11, the logic further operable to communicate an instruction to the first endpoint to verify that the data packets comprise the first virtual local area network identifier, wherein the first endpoint is operable to change the first local area network identifier to the second virtual local area network identifier if the data packets are non-voice data packets.

13. A network switch, comprising:
an interface operable to receive a request for configuration of a first endpoint;
a processor operable to:
determine a first virtual local area network associated with the voice data packets, wherein a first virtual local area network identifier is associated with the first virtual local area network;
determine a second virtual local area network associated with non-voice data packets, wherein a second virtual local area network identifier is associated with the second virtual local area network;
a memory operable to store the first virtual local area network identifier and the second virtual local area network identifier, wherein the first virtual local area network identifier is associated with voice data packets and the second virtual local area network identifier is associated with non-voice data packets; and
wherein the network switch communicates, to the first endpoint, a first virtual local area network identifier associated with the first virtual local area network, wherein the first endpoint is operable to transmit data packets comprising the first virtual local area network identifier if the data packets are voice data packets.

14. The network switch of claim 13, wherein the interface is operable to:
receive voice data packets and non-voice data packets;
communicate the voice data packets to the first virtual local area network;
communicate the non-voice data packets to the second virtual local area network.

15. The network switch of claim 13, wherein communicating, to the first endpoint, a first virtual local area network identifier comprises communicating the first virtual local area network identifier in a discovery protocol message.

16. The network switch of claim 13, the interface further operable to receive data packets from the first endpoint, wherein data packets comprise the first virtual local area network identifier if the data packets are voice data packets.

17. The network switch of claim 16, the interface further operable to communicate an instruction to the first endpoint to verify that the data packets comprise the first virtual local area network identifier, wherein the first endpoint is operable to change the first local area network identifier to the second virtual local area network identifier if the data packets are non-voice data packets.

* * * * *